(12) United States Patent
Lee et al.

(10) Patent No.: US 7,638,973 B2
(45) Date of Patent: Dec. 29, 2009

(54) SYSTEM FOR CONTROLLING VOLTAGE BALANCING IN A PLURALITY OF LITHIUM-ION CELL BATTERY PACKS AND METHOD THEREOF

(75) Inventors: Dal-Hoon Lee, Seoul (KR); Han-Ho Lee, Daejeon (KR); Jee-Ho Kim, Daejeon (KR); Eguchi Yasuhito, Ebina (JP)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 11/722,765

(22) PCT Filed: Dec. 22, 2005

(86) PCT No.: PCT/KR2005/004452

§ 371 (c)(1),
(2), (4) Date: May 22, 2008

(87) PCT Pub. No.: WO2006/068430

PCT Pub. Date: Jun. 29, 2006

(65) Prior Publication Data

US 2008/0303484 A1 Dec. 11, 2008

(30) Foreign Application Priority Data

Dec. 24, 2004 (KR) .................. 10-2004-0112018

(51) Int. Cl.
*H02J 7/00* (2006.01)
(52) U.S. Cl. .................. 320/118; 320/119; 320/121; 702/63

(58) Field of Classification Search .................. 320/118, 320/119, 121; 702/63
See application file for complete search history.

(56) References Cited

U.S. PATENT DOCUMENTS 5,498,950 A * 3/1996 Ouwerkerk .................. 320/119
5,710,503 A * 1/1998 Sideris et al. ................ 324/431

(Continued)

FOREIGN PATENT DOCUMENTS

JP 2000182677 6/2000

(Continued)

OTHER PUBLICATIONS

International Search Report; PCT/KR2005/004452; Apr. 7, 2006 All the references cited in the Search Report are listed above.

*Primary Examiner*—Edward Tso
*Assistant Examiner*—Samuel Berhanu
(74) *Attorney, Agent, or Firm*—Birch, Stewart, Kolasch & Birch, LLP

(57) ABSTRACT

Disclosed is a system for adjusting a voltage balancing of cells in a lithium ion multicell battery pack. The system comprises a vertical interface outputting inputs of a reading balance signal defining a voltage reading period and a balance period and a reading hold signal holding a cell voltage when reading a voltage; an interface outputting an address clock for designating an address of a cell to be controlled and an input of a balance hold signal for independently reading a cell voltage within a voltage balance period; and a control section of a cell balancing adjusting circuit connected to the vertical interface and the interface and receiving signal outputs therefrom to adjust a balancing of cells.

14 Claims, 4 Drawing Sheets

U.S. PATENT DOCUMENTS

| | | | |
|---|---|---|---|
| 5,998,967 A | 12/1999 | Umeki et al. | |
| 6,114,835 A * | 9/2000 | Price | 320/118 |
| 7,573,394 B2 * | 8/2009 | Yamashita et al. | 340/636.1 |
| 2006/0103350 A1 * | 5/2006 | Lai | 320/118 |
| 2006/0103351 A1 * | 5/2006 | Tanigawa et al. | 320/118 |
| 2008/0090133 A1 * | 4/2008 | Lim et al. | 429/50 |
| 2008/0129247 A1 * | 6/2008 | Lee et al. | 320/134 |

FOREIGN PATENT DOCUMENTS

| | | |
|---|---|---|
| JP | 2002-374633 A | 12/2002 |
| JP | 2004301782 | 10/2004 |

* cited by examiner

[Fig. 1]
Prior Art
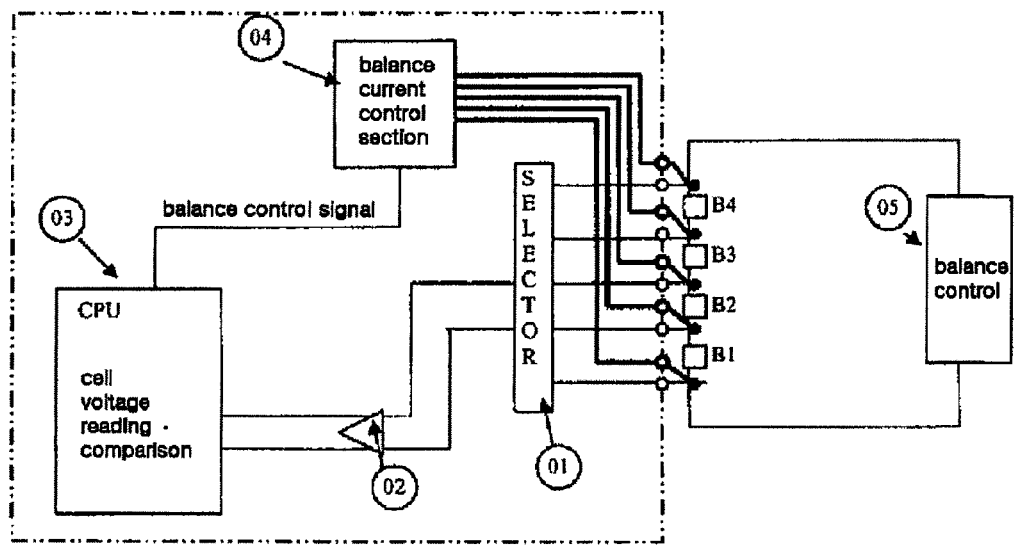
[Fig. 2]
Prior Art
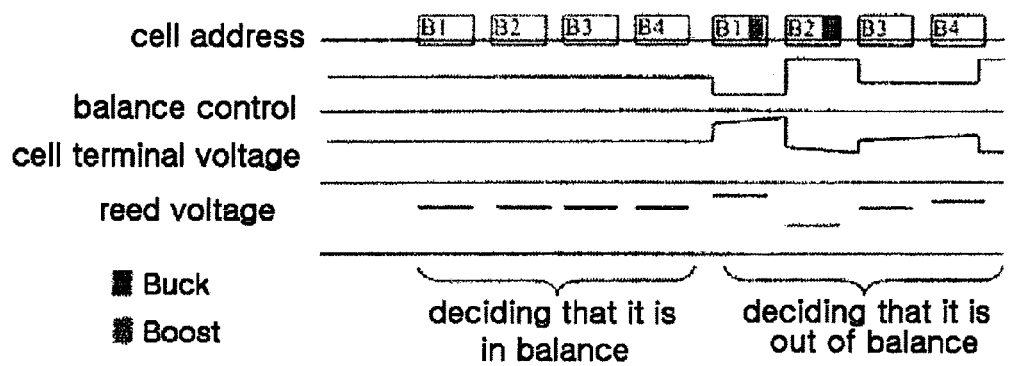

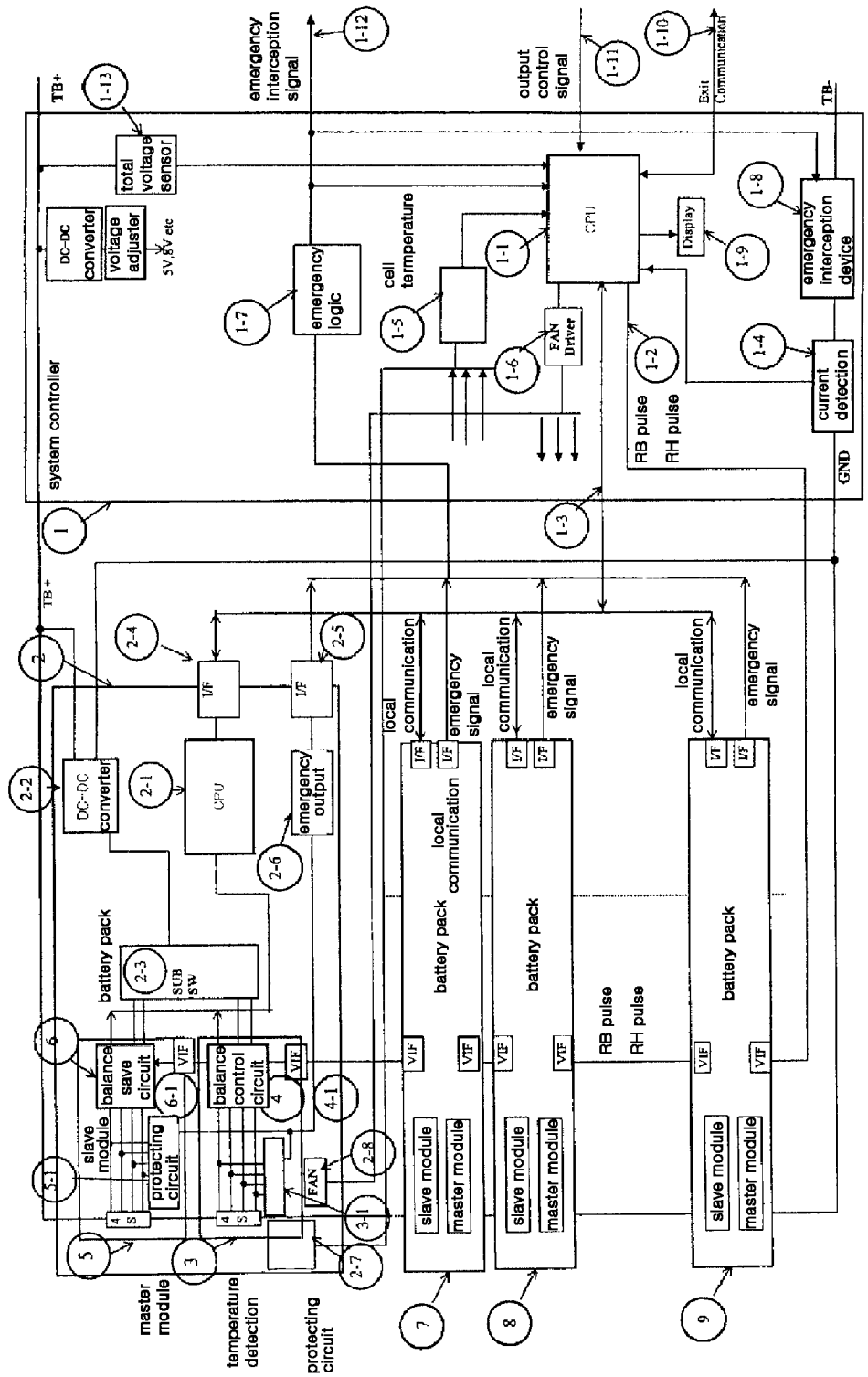
[Fig. 3]

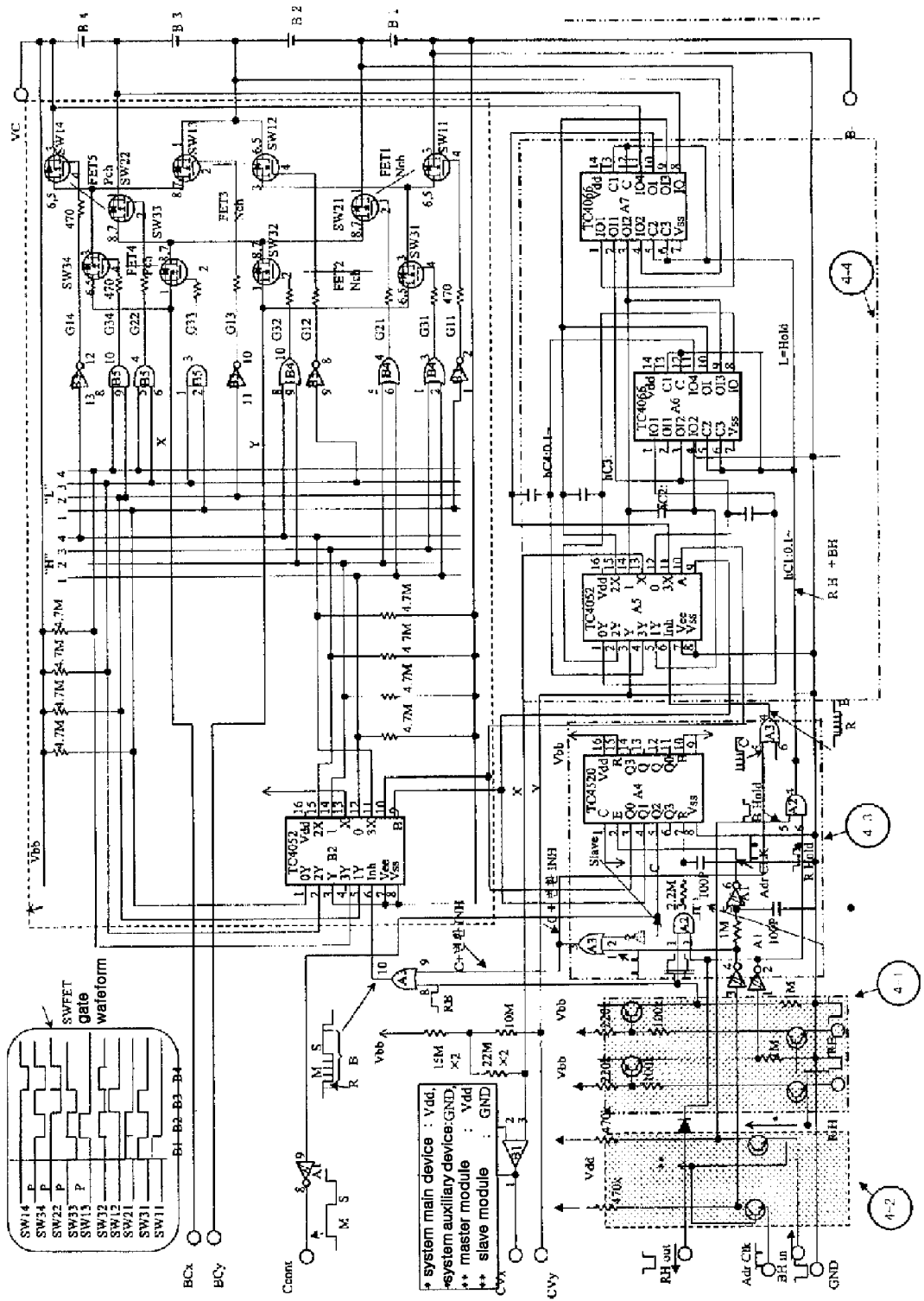
[Fig. 4]

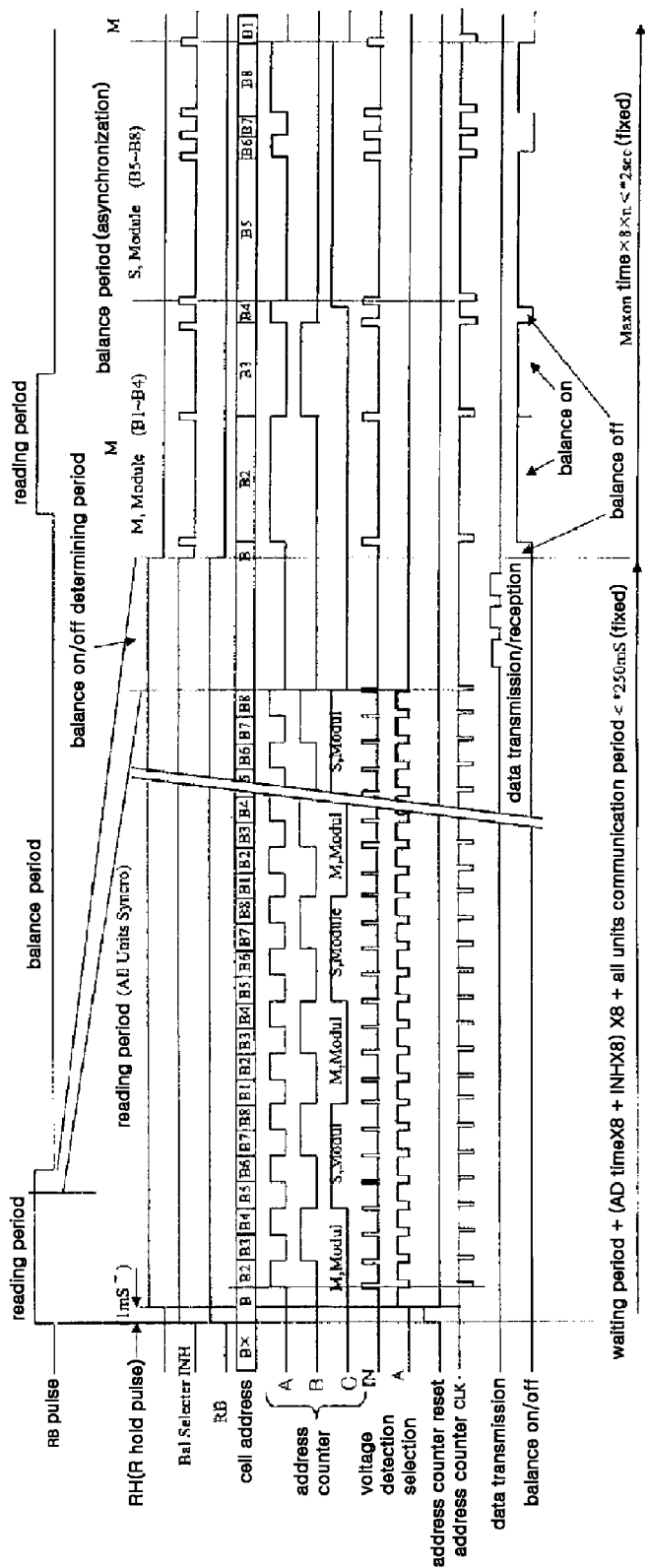
[Fig. 5]

SYSTEM FOR CONTROLLING VOLTAGE BALANCING IN A PLURALITY OF LITHIUM-ION CELL BATTERY PACKS AND METHOD THEREOF

TECHNICAL FIELD

The invention relates to a battery balancing system reading voltages of cells in a multicell battery pack and comparing the read voltages to charge or discharge the cells, and more particularly to a battery balancing system turning off a balance current when measuring a cell voltage and enabling the balance current to flow during a balance period, thereby improving an accuracy of a voltage balancing of cells.

BACKGROUND ART

In general, a battery power supply unit is an electric power source supplying an energy to a related electronic device and a multicell battery pack is applied as the supply unit. By using the multicell pack, rather than a single cell, it is possible to apply a high voltage or to increase a capacity. However, since the cell itself has charge/discharge characteristics, a voltage of each cell tends to be unbalanced as time goes by.

The voltage difference between the cells in the battery pack may generate an un-balancing between the battery cells, thereby causing a capacity loss of the battery pack. With regard to this, it has been developed various battery balancing systems and methods for balancing each cell so as to prevent overcharges of all battery cells and to uniformly charge the cells.

For example, there is a method of allowing a current to flow to a high voltage cell of cells in a battery pack through a resistance and the like so as to adjust a battery balancing. Although this method is simple, it has a disadvantage that a discharge current is increased and heat is much generated if the number of unbalanced high voltage cells is increased. In addition, the method has also a disadvantage that the balance is adjusted to a cell having the lowest voltage of the cells in the battery pack.

In addition, there is a method of allowing a charge current to flow to a low voltage cell of cells in a battery pack so as to adjust a balancing. This method uses a DC-DC converter and has advantages that an efficiency is generally high and heat is less generated.

However, the method has also a disadvantage that a cell voltage of the entire battery pack becomes lower than its original lowest voltage if the number of low voltage cells is increased.

Further, there is a method of detecting a voltage irrespective of whether a balance current flows in a cell or nor when detecting voltages of cells in a battery pack. This method has disadvantages that there occurs a voltage drop due to the balance current and a voltage cannot be correctly detected in a system of adjusting a balance with a high current or a system of commonly using a path in which the balance current flows and a voltage detection path.

For example, in case that a balance current flows to a cell, a terminal voltage of the cell is complicatedly changed due to a change of the balance current. Accordingly, when there is a cell in which the balancing current flows, if a voltage is read irrespective of the balancing current, voltage values of the respective cells are differently read even though all the cells are balanced.

The above case is described with reference to FIGS. 1 and 2.

FIG. 1 is a schematic view of a system commonly using a path in which a balance current flows and a voltage detection path in a lithium ion cell battery of the prior art and FIG. 2 is a view showing voltage values read in a lithium ion cell battery of the prior art.

Referring to FIG. 1, in case that load current flows through a load device 5 in a voltage balancing adjusting apparatus according to the prior art, terminal voltages of cells are sensitively changed according to variances or magnitudes of the load current. In addition, in case that it is performed a boost balancing for a cell (B1) and a buck balancing for a cell (B2) by a balance current control section 4, when voltages of cells (B1, B2, B3, B4) are detected, voltage values of the respective cell terminals are differently read even though voltages of all cells are substantially balanced. As a result, a CPU 3 decides that each of the cells is unbalanced, and thus outputs a balance control signal to control a balance current control section 4.

Referring to FIG. 2, if the cell terminal voltages are read when the balance current does not flow in the battery balancing system, it can be seen that the terminal voltages of the cells (B1, B2, B3, B4) are constantly balanced. Accordingly, the CPU 3 decides that the voltage of the cell terminal is balanced. However, if the cell terminal voltages are read when the balance current flows, the CPU 3 decides that the voltages of the cell terminals are out of balance.

Like this, if the CPU 3 reads the terminal voltages of the cells when the balance current flows, the read voltage values of the cells may be different due to a voltage drop resulting from the balance current.

Accordingly, the battery balancing system according to the prior art has diverse condition limitations. For example, it performs a voltage balancing only when the system itself is not operated. Due to the limitations, the voltage balancing operation becomes complicated, an unnecessary time is consumed and an accuracy of the voltage balancing is decreased.

Therefore, it is required a battery balancing system or method capable of eliminating a voltage reading error of cells in a cell system, rapidly performing a voltage balancing and increasing an accuracy of a voltage balancing.

DISCLOSURE OF INVENTION

Technical Problem

Accordingly, the invention has been made to solve the problems occurring in the prior art. An object of the invention is to divide a balance period and a voltage measuring period in a lithium ion cell battery, thereby improving an accuracy of a voltage balancing.

Technical Solution

In order to achieve the above object, there is provided a system for adjusting a voltage balancing of cells in a lithium ion multicell battery pack, the system comprising a vertical interface outputting inputs of a reading balance signal defining a voltage reading period and a balance period and a reading hold signal holding a cell voltage when reading a voltage; an interface outputting an address clock for designating an address of a cell to be controlled and an input of a balance hold signal for independently reading a cell voltage within the voltage balance period; and a control section of a cell balancing adjusting circuit connected to the vertical interface and the interface and receiving signal outputs therefrom to adjust a balancing of cells.

According to a preferred embodiment of the invention, the address counter may sequentially change lines of the cells when an address counter clock is inputted.

According to a preferred embodiment of the invention, the system may further comprise a voltage detecting switch section for reading a voltage of one of the cells and a current switch section for supplying a balance current to one of the cells.

According to an embodiment of the invention, during the reading period, the cell voltage may be read to determine a target value of the balance and to decide to which cell the balance current is allowed to flow. During the balance period, the balance current may flow to the decided cell.

According to an embodiment of the invention, the address counter may produce a reset pulse by a time difference between the reading balance pulse and the reading hold pulse.

ADVANTAGEOUS EFFECTS

According to the invention, it is clearly divided the balance period and the voltage measuring period in the lithium ion cell battery. Accordingly, it is possible to improve an accuracy of the voltage balancing by allowing the balance current not to flow during the voltage measuring period.

BRIEF DESCRIPTION OF THE DRAWINGS

The above and other objects, features and advantages of the present invention will be more apparent from the following detailed description taken in conjunction with the accompanying drawings, in which:

FIG. 1 is a schematic view showing an apparatus adjusting a voltage balancing using a line selecting device in a lithium ion cell battery according to the prior art;

FIG. 2 is a view showing a voltage reading timing of cells in a lithium ion cell battery according to the prior art;

FIG. 3 shows a voltage balancing system of cells in a multicell battery pack, according to an embodiment of the invention;

FIG. 4 is a block diagram showing a master module of a lithium ion cell battery according to an embodiment of the invention; and FIG. 5 is a timing diagram showing a reading period and a balancing period according to an embodiment of the invention.

BEST MODE FOR CARRYING OUT THE INVENTION

Hereinafter, preferred embodiments of the present invention will be described with reference to the accompanying drawings. In the following descriptions of the present invention, a detailed description of known functions and configurations incorporated herein will be omitted when it may make the subject matter of the present invention rather unclear.

FIG. 3 shows a system performing a voltage balancing of cells of a multicell battery pack according to an embodiment of the invention.

A system controller 1 comprises a CPU 1-1, and collects and calculates diverse cell related data of each battery pack from a plurality of multicell battery packs 2, 7, 8, 9 and system inside sensors 1-4, 1-5, 1-13, thereby controlling the whole system. In addition, the controller 1 transmits data or a control signal to an apparatus using the plurality of multicell battery packs.

Output terminals of cells (4S+4S) of the multicell battery packs 2, 7, 8, 9 are connected in series. A highest output terminal (TB+) and a lowest output terminal (TB−) of the multicell battery pack are used as a power output terminal of the system.

In addition, the output terminal (TB−) of the multicell battery pack passes through a current detecting device 1-4 and an emergency interception device 1-8. The current detecting device 1-4 is provided to detect current flowing in a cell and a resistance or Hall device is used as the current reading device.

The multicell battery pack 2 comprises a CPU 2-1, a DC-DC converter 2-2, an auxiliary switch 2-3, a master module 3 and a slave module 5.

The master module 3 and the slave module 5 have a substantially same structure.

The master module 3 comprises four cells 4S, a protecting circuit 3-1 and a balance control circuit 4. The slave module 5 comprises four cells 4S, a protecting circuit 5-1 and a balance control circuit 6. The balance control circuits 4, 6 have a function of converting a terminal voltage of each cell into a ground potential so that the CPU 2-1 can read the terminal voltage.

The balance control circuits 4, 6 of the master module 3 and the slave module 5 are respectively structured such that they can transmit/receive a signal through a vertical interface 6-1 (VIF). In addition, a vertical interface 4-1 in the balance control circuit 4 of the master module 3 can transmit/receive a signal with the multicell battery pack 7 below thereof. The signal comprises a signal for synchronizing the multicell battery pack 2 and a signal for synchronizing an interval of the multicell battery pack 2 and the multicell battery pack 7. These signals are transmitted/received between all the multicell battery packs 2, 7, 8, 9 through the vertical interfaces, thereby synchronizing all the battery packs.

Hereinafter, a voltage balancing of a master module of a multicell battery pack in the above voltage balancing system according to an embodiment of the invention will be described with reference to FIG. 4.

Referring to FIG. 4, the master module 3 comprises the vertical interface 4-1, an interface 4-2, a control section 4-3, a voltage switch section 4-4 and a current switch section 4-5.

The vertical interface 4-1 consists of two NPN transistors and two PNP transistors. Since the NPN transistor is turned on by applying a bias voltage to a base terminal thereof, an emitter terminal is inputted with a reading hold (RH) pulse and a reading balance (RB) pulse. Accordingly, when a "low (L)" signal is inputted through the emitter terminal of the NPN transistor, the PNP transistor is turned on, so that an inversion output can be obtained through an inverter. The inversion output is inputted into the control section 4-3 of a balance control circuit.

Like this, the vertical interface 4-1 is under "hold period" when the reading hold (RH) signal is at the "low (L)" state. The cell terminal voltage just before the reading hold signal becomes the "low (L)" state is held in hold condensers (hC1~4).

It is a "reading period" when the reading balance (RB) signal is at a "high (H)" state and a "balance period" when the reading balance (RB) signal is at the "low (L)" state.

The interface 4-2 consists of two NPN transistors and resistances. A base of the NPN transistor is connected to a bias power supply and under turned-on state. An emitter terminal of the NPN transistor is inputted with a balance hold (BH) pulse and an address clock (AdrClk) pulse. In addition, an output thereof is inputted into the control section 4-3 of the balance control circuit.

Accordingly, it becomes a hold state when the balance hold (BH) pulse is at the "low (L)" state. The cell terminal voltage just before the balance hold (BH) pulse becomes the "low (L)" state is held in the hold condenser (hC). The balance hold (BH) pulse is provided to read a cell voltage during the balance period. Although the reading hold (RH) pulse is provided to synchronize balancing operations of all the cells, the balance hold (BH) pulse is provided to perform a voltage reading with an independent timing, rather than taking a synchronization between the cells.

In addition, the address clock (AdrClk) is converted into the "low (L)" state from the "high (H)" state. It is structured that the "low (L)" period is shorter than the "high (H)" period and a cell alternation switch is inhibited (INH) during the "low (L)" state. As a result, it is possible to prevent an abnormal operation occurring during a transition state of a cell replacement and it is preferred to secure the period of the "low (L)" state until the transition state is stabilized.

An address counter (IC A4) of the control section 4-3 designates cell addresses of the voltage detecting switch section 4-4 and the current switch section 4-5. The voltage detecting switch section 4-4 is provided to read a voltage of one of the cells and the current switch section 4-5 is provided to supply the balance current to one of the cells.

The address clock (AdrClk) is inputted into a terminal (E) of the address counter. Outputs (Q0, Q1) of the address counter are inputted into selection terminals (A, B) of an analog line selecting device (IC B2) of the current switch section 4-5 and an analog line selecting device (IC A5) of the voltage detecting switch section 4-4. The line selecting devices (IC B2, IC A5) are converted into four lines with a combination of the selection terminals (A, B). Each line corresponds to cells (B1~B4).

The lines are changed to correspond to the cell (B1) when the address counter (IC A4) is under reset state and to sequentially correspond to the cells (B2, B3, B4) when the address clock (AdrClk) is inputted.

An output terminal (Q2) of the address counter (IC A4) is used to convert the master module and the slave module. When the output terminal (Q2) is at the "low (L)" state, the slave module becomes the INH state and when it is at the "high (H)" state, the master module becomes the INH state. Thereby, the master module and the slave module are converted.

A reset terminal (R) of the address counter (IC A4) is inputted with a reset pulse just before the reading hold (RH) pulse enters. Thereby, the counter counts from "zero (0)". In order to produce the reset pulse, it is determined a width or timing of the reading balance (RB) pulse and the reading hold (RH) pulse. The reading balance (RB) pulse is inputted earlier than the reading hold (RH) pulse.

INH terminals of the analog line selecting device (IC B2) of the current switch section 4-5 and the analog selecting device (IC A5) of the voltage detecting switch section 4-4 are inputted with the output (Q2) of the address counter (IC A4) and INH pulses from the reading balance (RB) clock and the address clock (AdrClk).

Hereinafter, an operation of the above structure will be described with reference to a timing chart of FIG. 5.

Referring to FIG. 5, the reading balance (RB) pulse inputted through the vertical interface 4-1 defines the "reading period" and the "balance period". In other words, it is referred to as the "reading period" when the reading pulse is at the "high (H)" state and the "balance period" when the reading pulse is at the "low (L)" state.

During the "reading period", the balance current is turned off, the cell voltage is read, and it is determined a target value of the balance and a cell to which the balance current is allowed to flow. After the "reading period", the balance current flows to the determined cell during the "balance period".

All the battery packs of the balancing system are operated to synchronize with the reading balance (RB) pulse.

The reading hold (RH) pulse holds the cell voltage. It is a "hold period" when the reading hold pulse is at the "high (H)" state and a "non-hold period" when the reading hold pulse is at the "low (L)" state.

The reading hold (RH) pulse becomes the "high (H)" somewhat later than the reading balance (RB) pulse. The reading hold (RH) pulse does not require the "high (H)" state if the cell voltage reading is terminated.

However, according to the invention, it is structured that the reading balance (RB) pulse maintains the "high (H)" state during the "high (H)" state period and becomes the "low (L)" state at the same timing as the reading balance (RB) pulse.

Due to the time difference between the reading balance (RB) pulse and the reading hold (RH) pulse, the address counter produces the reset pulse. The address counter (A4) is reset by the reset pulse.

When the address counter (A4) is reset, since pins of the address counter (A, B, C, not shown) are reset (i.e., A=0, B=0, C=), the cell (B1) is addressed. However, at this time, it is impossible to detect the voltage of the cell (B1). When the reading hold (RH) pulse becomes the "high (H)" state, the terminal voltages of all the cells are held and thus cannot be detected. When the address counter clock (AdrClk) is inputted after detecting the terminal voltage, A=1, B=0 and C=0, so that the cell (B2) is addressed and the voltage of the cell (B2) is thus detected.

When the address counter clock (AdrClk) is inputted five times, A=0, B=0 and C=1 and it is converted from the master module to the slave module, it is progressed to the cells (B5~B8). After that, the address counter repeats the above operation. As a result, the cell voltage reading is repetitively performed to read the data, so that it is possible to increase an accuracy of the voltage reading.

The detected cell voltage is inputted into the CPU. The CPU communicates with the system controller to transmit/receive the data. The target voltage of the balance is determined by the transmission/reception, thereby deciding a cell of the balance on/off. A direction of the balance current is determined as either a cell charge direction or cell discharge direction by comparing the target voltage of the balance and the detected voltage.

When the reading balance pulse enters into the balance period, the balance current is allowed to flow to a cell corresponding to the balance on, according to the balance on/off determined in advance. For example, in case of the cell (B1), since the balance current thereof is under "off state", it is progressed to the address of the cell (B2) after the address counter clock (AdrClk) again enters. The cell (B2) affects the address thereof for a long time since the balance current thereof is under "on state". Likewise, the cells (B3, B5, B8) are under on state for a long time.

Since the balance on/off situations are different according to the battery packs, the operation between the battery packs during the balance period becomes an asynchronization state. When the balance (B) period of the reading balance (RB) pulse is terminated, all battery packs terminates the balance operation and it becomes the reading (R) period.

Like this, it is clearly divided the balance period and the voltage reading period in the lithium ion cell battery, so that it is possible to improve an accuracy of the voltage balancing.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A system for adjusting a voltage balancing of cells in lithium ion multicell battery packs, the system comprising:
   a vertical interface connected to a battery pack and configured to output synchronized inputs of a reading balance signal defining a voltage reading period and a balance period and a reading hold signal inducing each cell voltage to be held before the voltage reading period;
   an interface connected to the battery pack and configured to output an address clock for designating an address of a cell whose voltage is being held; and
   a control section of a cell balancing adjusting circuit connected to the vertical interface and the interface and configured to receive signal outputs therefrom to adjust a balancing of cells.

2. The system according to claim 1, wherein the control section of the cell balancing adjusting circuit comprises an address counter for sequentially changing lines of the cells according to the address clock.

3. The system according to claim 1, further comprising a voltage detecting switch section configured to read a voltage of one of the cells and a current switch section configured to supply a balance current to one of the cells.

4. The system according to claim 3, wherein the control section turns off a balance current, determines a balance target value and decides to which cell the balance current is allowed to flow, during the voltage reading period.

5. The system according to claim 4, wherein the control section allows the balance current to flow the decided cell during the balance period.

6. The system according to claim 2, wherein the address counter produces a reset pulse by a time difference between the reading balance signal and the reading hold signal.

7. The system according to claim 1, wherein the interface is configured to output an input of a balance hold signal for independently reading a cell voltage within the balance period.

8. The system according to claim 1, wherein the vertical interface is disposed between adjacent battery packs.

9. The system according to claim 1, further comprising:
   hold condensers configured to respectively hold each voltage of cells according to the reading hold signal.

10. A method for adjusting a voltage balancing of cells in lithium ion multicell battery packs, the method comprising the steps of:
    receiving synchronized inputs of a reading balance signal defining a voltage reading period and a balance period and a reading hold signal inducing each cell voltage to be held;
    holding each cell voltage before the voltage reading period according to the synchronized reading hold signal;
    selecting each cell using an address counter clock and reading a voltage of the selected cell, during the voltage reading period;
    determining a cell to which a balance current is allowed to flow, based on a balance target value; and
    allowing the balance current to flow to the determined cell during the balance period.

11. The method according to claim 10, wherein the balance current flows to either a cell charge direction or cell discharge direction according to a comparison of the read voltage of the cell and the balance target value.

12. The method according to claim 10, wherein a hold of the cell voltage is performed after turning off the balance current based on the reading balance signal.

13. The method according to claim 10, wherein during the voltage reading period, the voltage of the selected cell is read after holding voltages of the cells, responsive to a reading hold signal.

14. The method according to claim 10, wherein the step of holding is performed when the voltage level of the reading hold signal is changed.

* * * * *